United States Patent

King et al.

[11] 4,127,565
[45] Nov. 28, 1978

[54] PROCESS FOR MAKING FIBER-FORMING POLYESTERS

[75] Inventors: Henry L. King, Cary; Chester C. Wu, Raleigh, both of N.C.

[73] Assignee: Monsanto Company, Decatur, Ala.

[21] Appl. No.: 863,288

[22] Filed: Dec. 22, 1977

[51] Int. Cl.$^2$ .................. C08G 63/20; C08G 63/68
[52] U.S. Cl. .................. 528/283; 260/45.8 R; 528/273; 528/289; 528/287; 528/194
[58] Field of Search ............. 260/75 N, 75 P, 45.8 R, 260/76

[56] References Cited

U.S. PATENT DOCUMENTS

| | | | |
|---|---|---|---|
| 2,646,420 | 7/1953 | Morgan | 260/75 P |
| 3,459,711 | 8/1969 | Hartmann et al. | 260/75 P |
| 3,651,017 | 3/1972 | Tanabe et al. | 260/75 R |
| 4,073,829 | 2/1978 | Moedritzer | 260/860 |

FOREIGN PATENT DOCUMENTS

| | | | |
|---|---|---|---|
| 50-71,925 | 6/1975 | Japan | 260/75 P |
| 51-26,996 | 3/1976 | Japan | 260/75 P |

Primary Examiner—Lucille M. Phynes
Attorney, Agent, or Firm—Robert L. Broad, Jr.

[57] ABSTRACT

A flame-retardant, easily dyeable polyester and the process for preparing the same by polycondensing a glycol phthalate prepolymer with a phosphine oxide and dye improver selected from the group consisting of $$R-O(G-O)_x-H$$

where R is an alkyl group containing an average of from about 8 to about 20 carbon atoms; G is a hydrocarbon radical selected from the group consisting of ethylene, propylene, butylene and isomers thereof, and mixtures of the above, and x has a value of about 8–20, and

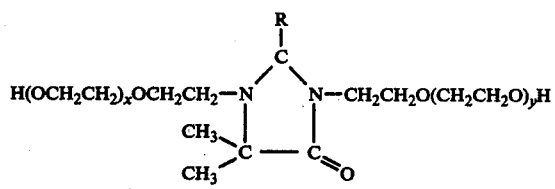

where R is O, (CH$_3$)$_2$ or H$_2$ and the sum of x and y is 4–30.

The polymer will be made up of 82 to 98 weight percent of the prepolymer, 8 to 1 weight percent of the dyeability improver and 10–1 weight percent of the phosphine oxide and is preferably formed in the presence of a catalyst which is the reaction product of germanium dioxide and a tetraalkyl ammonium hydroxide.

13 Claims, No Drawings

PROCESS FOR MAKING FIBER-FORMING POLYESTERS

BACKGROUND OF THE INVENTION

1. Field of the Invention

This invention relates to polyester polymers having improved dyeability and flame retardance and the process for making the same.

2. Description of the Prior Art

It is known to use germanium dioxide as a catalyst in a polycondensation reaction to produce polyesters. Usually, the germanium dioxide is added to the reaction mixture with a glycol, such as ethylene glycol. Unfortunately, crystalline germanium dioxide has a low solubility in the glycols suitable for use in making fiber-forming polymers, resulting in undissolved catalyst which remains in the polymer to give the polymer poor characteristics. Also, low catalyst concentrations require longer reaction times.

One of the properties of polyester fibers in need of improvement is the rate of disperse dye uptake. Generally, the use of carriers and/or high temperatures is required to adequately dye polyesters in a reasonable length of time. Attempts have been made by polyester manufacturers to make polyester easier to dye. One approach has been the use of selected copolymers. Copolymers will generally have a more open structure than homopolymers and it is thus easier for the dye molecule to penetrate a fiber made from the polymer. The composition of the copolymer required may, however, be such as to render other fiber and polymer properties unacceptable or undesirable from a commercial standpoint.

It is known to use certain phosphine oxides as fire retarding agents in polyester polymers. It is also known to use certain dyeability improvers in polyesters for making these polyesters easier to dye. However, it has not been known that, by using certain phosphine oxides with certain dyeability improvers, substantially equivalent dyeability can be achieved with substantially less of the dyeability improver.

In the process of the present invention, a glycol phthalate prepolymer is polycondensed with certain dyeability improvers and certain phosphine oxides, preferably in the presence of a catalyst which is the reaction product of germanium dioxide and a tetraalkyl ammonium hydroxide. The polymer produced has flame-retardant characteristics and is more easily dyed.

SUMMARY OF THE INVENTION

A fiber-forming polyester polymer having improved dyeability and flame retardant characteristics and the process for making the same wherein a glycol phthalate prepolymer is polycondensed with a phosphine oxide and a dyeability improver selected from the group consisting of R—O(G—O)$_x$—H where R is an alkyl group containing an average of from about 8 to about 20 carbon atoms; G is a hydrocarbon radical selected from the group consisting of ethylene propylene, butylene and isomers thereof, and mixtures of the above, and x has an average value of about 8–20, and

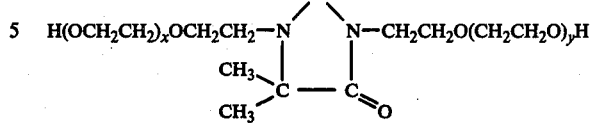

where R is O, (CH$_3$)$_2$ or H$_2$ and the sum of x and y is 4–30, preferably in the presence of an effective amount of the reaction product of germanium dioxide and a tetraalkyl ammonium hydroxide. The preferred tetraalkyl ammonium hydroxides are tetramethyl ammonium hydroxide and tetraethyl ammonium hydroxide.

Fibers formed from these polymers have flame retardant characteristics and are more easily dyed, using lesser amounts of dyeability improver.

DETAILED DESCRIPTION OF THE INVENTION

The prepolymer used in the process of the present invention is formed by reacting a glycol with a dibasic acid such as terephthalic acid in a known manner to form a glycol phthalate prepolymer. The glycol phthalate prepolymer may then be reacted, in the process of the present invention, with one of the dyeability improvers and one of the phosphine oxides described below by a polycondensation reaction, thereby forming a fiber-forming polymer. Conventional pressures and temperatures are used. These are well known.

The polymer will be made up of 82–98 weight percent of the prepolymer, 8–1 weight percent of the dyeability improver and 10–1 weight percent of the phosphine oxide.

The presence of the dyeability improver in the polymer enhances the disperse dyeability of fibers made from the polymer. The presence of the phosphine oxide enhances the flame retardant characteristics of the polymer and also enhances the effectiveness of the dyeability improver, so that less of the dyeability improver is needed.

Other glycols, such as propane diol, butane diol, pentane diol or hexane diol may be used instead of ethylene glycol in making the prepolymer, though ethylene glycol is preferred.

Other dibasic acids may be used with the glycol to form the prepolymer. Isophthalic and terephthalic acids are the preferred acids, with terephthalic acid being the most preferred.

THE PREPOLYMER

The glycol phthalate prepolymer which is reacted with the phosphine oxide and the dyeability improver may be prepared in a known manner. For example, ethylene glycol and terephthalic acid in a molar ratio of 2:1 may be reacted at about 270° C. and 20 pounds pressure in a continuous esterifier to form ethylene terephthalate. Water of reaction and some ethylene glycol are removed by distillation and the low molecular weight prepolymer is collected continuously through a valve at the bottom of the reactor.

With an average residence time in the reactor of 135 minutes, the low molecular weight prepolymer will have an intrinsic viscosity of about 0.08 and a carboxyl concentration of about 660 microequivalents per gram, both measured in a conventional manner. This and other processes for making both ethylene terephthalate and ethylene isophthalate prepolymers are known.

THE DYEABILITY IMPROVER

In order to provide a polyester polymer having improved dyeability, the prepolymer is reacted, by the process of the present invention, in a polycondensation reaction with a phosphine oxide and a dyeability improver selected from the group consisting of

R—O(G—O)$_x$—H where R is an alkyl group containing an average of from about 8 to about 20 carbon atoms; G is a hydrocarbon radical selected from the group consisting of ethylene, propylene, butylene and isomers thereof, and mixtures of the above, and $x$ has an average value of about 8-20. and

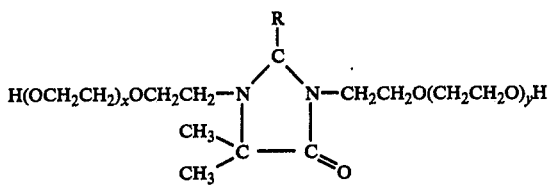

where R is O, (CH$_3$)$_2$ or H$_2$ and the sum of $x$ and $y$ is 4-30.

The preferred dyeability improvers are C$_{14-15}$H$_{29-31}$O(CH$_2$CH$_2$O)$_{14}$H and

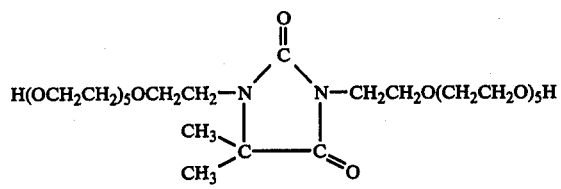

DYEABILITY TEST

The dyeabilities with disperse dye of the polymers made by this invention were determined by using the following procedure. Fibers were made from the polymer and samples of the fibers were scoured and dried. The dye dispersion used in making the dyeability test was prepared by mixing 250 mg of C.I. Disperse Blue 61 and 0.5 g of a commercial dispersing agent in a 250 ml volumetric flask together with an amount of deionized water sufficient to fill the flask to the full mark. One-half gram of fiber and 20 ml of the dye dispersion were placed in a small glass tube capable of withstanding internal pressure.

The dye tubes were placed in a rotating rack and held at 210°–212° F. After 2 hours the tubes were removed and quickly placed in ice and 5 ml aliquots were pipetted into 50 ml volumetric flasks which were then filled to the mark with dimethyl formamide. The optical density of each solution was measured in a 1 cm cell at the dominant wave length of the dye. A blank tube (dye only) was also prepared and its optical density was measured in the same way. The dyebath exhaustion was calculated for the change in optical density.

THE PHOSPHINE OXIDE

The phosphine oxide used in this invention may be monofunctional, difunctional or trifunctional. However, the difunctional oxide is preferred, for the reason that monofunctional oxides have a chain terminating effect and trifunctional oxides have a crosslinking effect. Halogenated phosphine oxides are included. The phosphine oxide will have the formula:

where R, R' and R" are alkyl, aryl, alkaryl or cycloalkyl radicals and at least one of R, R' and R" contains an ester or an ester-forming group.

While other phosphine oxides are suitable, those preferred are bis(carboxyethyl) methyl phosphine oxide, bis (hydroxypropyl) phenyl phosphine oxide, bis(carboxyethyl) phenyl phosphine oxide, bis(4-carboxyphenyl) methyl phosphine oxide, and bis(carboxyphenyl) phenyl phosphine oxide, with bis(carboxyethyl) methyl phosphine oxide being most preferred. Other phosphine oxides which may be used are:

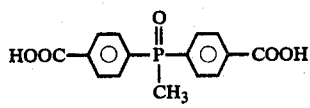

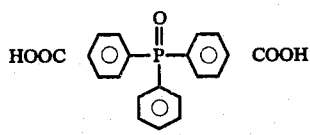

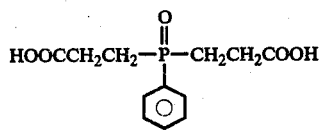

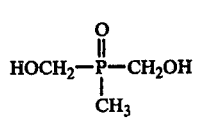

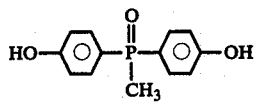

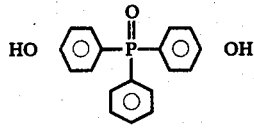

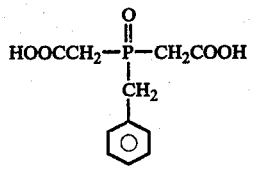

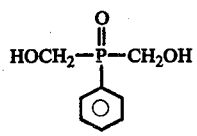

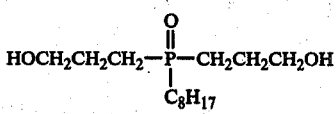 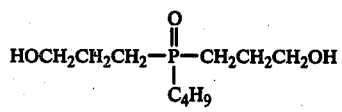

FLAME RETARDANCE TEST

The flame retardancy of the polymers was determined as follows. The polymer was extruded through a 10 hole spinnerette to form filaments; the filaments being quenched in a water bath and collected on a Leesona Model 955 wind-up machine. The filaments were drawn 5.0 times over a hot pin at 80° C. to yield a 50 denier yarn. The drawn yarn was knitted into a 9 cm diameter tube with 1 ply of 50 denier fiberglass on a Lawson knitter to contain 14 courses per centimeter using a 54 gauge head of 220 needles. The knit tube was mounted on a 4.4 × 15.2 cm metal frame and the oxygen index determined using a flow rate of $4 \pm 1$ cm$^3$ per second combined oxygen and nitrogen. The oxygen index of the tubing, containing equal parts of polymer and fiberglass, was determined using an MKM Model JD-14 oxygen index (OI) flammability tester.

THE CATALYST

The polycondensation reaction is preferably carried out in the presence of an effective amount of the reaction product of germanium dioxide and a tetraalkyl ammonium hydroxide (TAAH). Either tetramethyl ammonium hydroxide (TMAH) or tetraethyl ammonium hydroxide (TEAH) may be used. Preferably, TEAH is used. The germanium dioxide and the tetraalkyl ammonium hydroxide may be reacted in the presence of water or in a glycol suitable for preparing fiber-forming polyesters, the reaction product being the catalyst utilized in the process of the present invention. Preferably, the germanium dioxide and TAAH are reacted in the presence of ethylene glycol. The germanium dioxide and tetraalkyl ammonium hydroxide react on a molar ratio of 1:1.

Water added with the tetraalkyl ammonium hydroxide is, optionally, removed by distillation. The resulting solution is a clear, colorless solution of germanium dioxide/tetraalkyl ammonium hydroxide in glycol or water which is used as a catalyst in the polycondensation reaction of this invention. This catalyst is disclosed and claimed in copending application Ser. No. 863,284, filed Dec. 22, 1977 for Catalyst For Polyesters and Method for Making The Same, in the names of Henry L. King and Chester C. Wu.

The glycol Catalyst mixture will contain 1 to 25 weight percent germanium dioxide, with the preferred amount being 5 to 15 weight percent. Greater amounts of GeO$_2$/TAAH in the glycol will require less of the catalyst solution to carry out the polycondensation reaction. When the catalyst solution is added to the glycol phthalate/dyeability improver/phosphine oxide reaction mixture, the amount of catalyst, calculated as germanium dioxide, should be 0.008 to 0.04 weight percent, based on the weight of the glycol phthalate prepolymer.

EXAMPLE I (COMPARATIVE)

Two hundred grams of ethylene terephthalate prepolymer prepared as described above and 0.75 milliliters of GeO$_2$/TEAH catalyst solution of Example II were added to a 1 liter capacity, stirred, batch autoclave, the autoclave then being purged with nitrogen and heated to 275°–280° C. Pressure on the system was reduced by vacuum and polymerization to form high molecular weight poly(ethylene terephthalate) was carried out at a temperature of 275°–280° C. and a pressure of less than 2 mm Hg until the desired molecular weight was obtained.

A polymer with a melting point of 255° C. and an intrinsic viscosity of 0.64 was obtained in a period of 69 minutes from the start of pressure reduction. The polymer was then spun into filaments and the dyeability of the filaments was determined as set forth above. Fiber color was good but dyebath exhaustion was only 13% after 2 hours of dyeing at 100° C.

EXAMPLE II

This example illustrates a method for making the catalyst used in this invention. In making this catalyst, 1.05 grams (0.01 mole) of germanium dioxide in crystalline form and 1.82 grams (0.01 mole) of solid, hydrated tetramethyl ammonium hydroxide (50% active) were stirred with 3.3 grams of ethylene glycol. The solid GeO$_2$ dissolved almost immediately. The solution was then heated to remove water and the remaining liquid weighed 5.25 grams and contained 0.01 mole of catalyst.

Germanium dioxide (1.05 grams–0.01 mole) in crystalline form and 3.7 grams (0.01 mole) of 40% aqueous tetraethyl ammonium hydroxide (TEAH) were stirred with 8 grams of ethylene glycol. The solid GeO$_2$ dissolved almost immediately. The solution was heated to remove 2.25 grams of water. The remaining liquid was a clear, colorless solution weighing 10.5 grams and containing 0.01 mole of catalyst.

EXAMPLE III

Two hundred grams of ethylene terephthalate prepolymer, 2.0 grams (1.0 wt. %) of a monofunctional alkoxy poly(oxyalkylene) glycol having the structural formula C$_{14-15}$H$_{29-31}$—O(CH$_2$CH$_2$O)$_{14}$-H, and 0.75 ml of the GeO$_2$/TEAH catalyst solution of Example II were added to a 1-liter capacity, stirred batch autoclave, which was then purged with nitrogen and heated to 230°–250° C. Molten bis(carboxyethyl) methyl phosphine oxide, 10.5 grams, was added and polymerization was completed as in Example I. A polymer with an intrinsic viscosity of 0.65 was obtained in a period of 72 minutes after starting pressure reduction. The purity of drawn filaments formed from the polymer was 2.9 and brightness was 90.2. The filaments contained 0.77 weight percent phosphorus and melted at 243° C. The filaments had an oxygen index of 22.3. When dyed for 2 hours with C.I. Disperse Blue 61, the dyebath exhaustion was 57%.

EXAMPLE IV

Example III was repeated except that 2.0 grams (1.0 wt. %) of a difunctional hydantoin having the structure

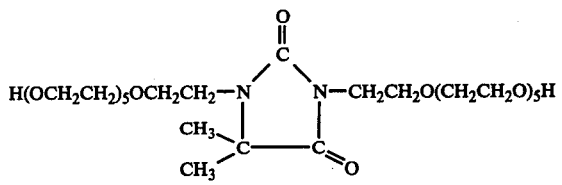

was used instead of the monofunctional dyeability improver of Example III. A polymer with an intrinsic viscosity of 0.65 was obtained in a period of 60 minutes from the start of pressure reduction. Drawn filaments formed from the polymer had a purity of 2.8 and a brightness of 90.2 and melted at 243° C. The oxygen index of the filaments was 22.3. Dyebath exhaustion was 54%.

EXAMPLES V-IX

Polymers were prepared as in Examples III-IV with other levels of the monofunctional and difunctional dyeability improvers of Examples III and IV. Polymers were also prepared using the dyeability improvers, but without the phosphine oxide. The following results were obtained.

| Example No. | Wt. % Dye Additive Mono-functional | Wt. % Dye Additive Difunctional | Wt.% Phosphine Oxide | Intrinsic Viscosity | M.P. °C | % Purity | % Brightness | % Dyebath Exhaustion | OI |
|---|---|---|---|---|---|---|---|---|---|
| V | 0 | 2 | 5.25 | 0.64 | 243 | 3.2 | 90.6 | 58.0 | 22.1 |
| VI | 0 | 3 | 5.25 | 0.67 | 242 | 3.1 | 90.4 | 63.5 | 22.1 |
| VII(Comp) | 0 | 5 | 0 | 0.66 | 251 | 2.2 | 89.1 | 42.5 | 19.7 |
| VIII | 2 | 0 | 5.25 | 0.66 | 243 | 2.9 | 88.2 | 60.0 | 22.3 |
| IX(Comp) | 5 | 0 | 0 | 0.64 | 251 | 1.8 | 91.2 | 53.0 | 19.8 |

Comparative Examples VII and IX show that dyeability is poorer when no phosphine oxide is used, even with much greater amounts of the dyeability improver being used.

EXAMPLE X

Two hundred grams of prepolymer and 0.75 ml of GeO$_2$/TEAH catalyst solution of Example II were added to the autoclave. The autoclave was then purged with nitrogen and heated to 230°-250° C. Bis(3-hydroxypropyl) phenyl phosphine oxide, 12.5 grams was added through an addition port on top of the autoclave. The phosphine oxide was allowed to react with the prepolymer and pressure in the system was reduced by applying a vacuum. Polymerization to form a high molecular weight polymer was carried out at a temperature of 275°-280° C. and a pressure of less than 2 mm Hg until the desired molecular weight was obtained. The polymer had an intrinsic viscosity of 0.56 and a melting point of 242° C. Purity was 2.5 and brightness was 90.2. The oxygen index of the polymer was determined to be 22.2. When dyed for 2 hours with C.I. Disperse Blue 61 the dye bath exhaustion was 38.8%.

EXAMPLE XI

Two hundred grams of prepolymer, 2.0 grams (1.0 wt.%) of a difunctional hydantoin as used in Example IV, and 0.75 ml of the GeO$_2$/TEAH catalyst solution of Example II were heated, with stirring, in a 1-liter capacity batch autoclave. At 230°-250° C. bis(3-hydroxypropyl) phenyl phosphine oxide, 12.5 g, was added and polymerization was completed at 275°-280° C. as described in previous examples. The polymer obtained had an intrinsic viscosity of 0.58 and melted at 241° C.

Fibers formed from the polymer had a purity of 2.8 and a brightness of 89.5. The fibers had an oxygen index of 22.7. When dyed for 2 hours at 100° C. with C.I. Disperse Blue 61 the dyebath exhaustion was 45%.

What is claimed is:

1. A flame retardant and easily dyeable fiber-forming polyester polymer containing (A) 82-98 weight percent ethylene terephthalate; (B) 8 to 1 weight percent of a dyeability improver selected from the group consisting of

where R is an alkyl group containing from about 8 to about 20 carbon atoms; G is a hydrocarbon radical selected from the group consisting of ethylene, propylene, butylene and isomers thereof, and mixtures of the above, and x has a value of about 8-20, and

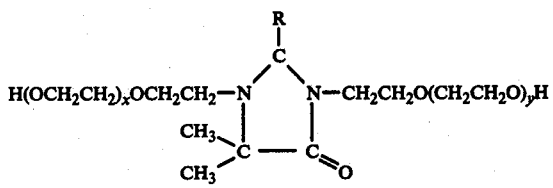

where R is O, (CH$_3$)$_2$ or H$_2$ and the sum of x and y is 4-30, and; (C) 10 to 1 weight percent of a phosphine oxide selected from the group consisting of bis(carboxyethyl) methyl phosphine oxide and bis(3-hydroxypropyl) phenyl phosphine oxide.

2. The polymer of claim 1 wherein the dyeability improver is selected from the group consisting of C$_{14-15}$H$_{29-31}$O(CH$_2$CH$_2$O)$_{14}$H and

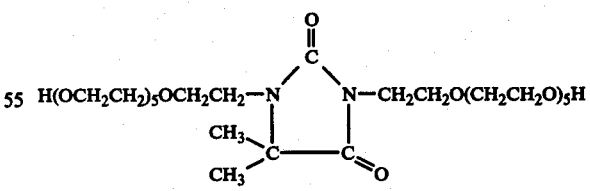

3. The polymer of claim 2 wherein the amount of dyeability improver is 1-3 weight percent, based on polymer weight.

4. The polymer of claim 2 wherein the dyeability improver is C$_{14-15}$H$_{29-31}$O(CH$_2$CH$_2$O)$_{14}$H and the phosphine oxide is bis(carboxyethyl) methyl phosphine oxide.

5. The polymer of claim 4 wherein the dyeability improver is

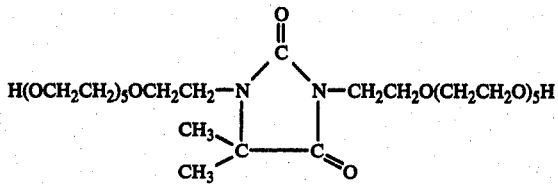

6. The process for making a flame-retardant, easily-dyeable polyester polymer, comprising polycondensing a glycol phthalate prepolymer with a dyeability improver selected from the group consisting of

where R is an alkyl group containing an average of from about 8 to 20 carbon atoms; G is a hydrocarbon radical selected from the group consisting of ethylene propylene, butylene and isomers thereof, and mixtures of the above, and x has an average value of about 8–20, and

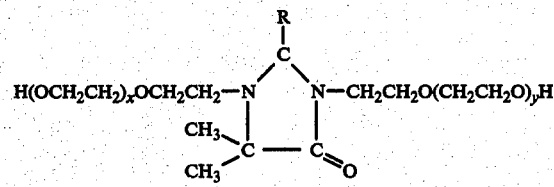

where R is O, $(CH_3)_2$ or $H_2$ and the sum of $x$ and $y$ is 4–30, and a phosphine oxide selected from the group consisting of bis(carboxyethyl) methyl phosphine oxide, bis(hydroxypropyl) phenyl phosphine oxide, bis(carboxyethyl) phenyl phosphine oxide, bis(4-carboxyphenyl) methyl phosphine oxide and bis (carboxyphenyl) phenyl phosphine oxide in the presence of an effective amount of the reaction product of germanium dioxide and a tetraalkyl ammonium hydroxide selected from the group consisting of tetramethyl ammonium hydroxide and tetraethyl ammonium hydroxide.

7. The process of claim 6 wherein the glycol phthalate is ethylene terephthalate.

8. The process of claim 7 wherein the amount of catalyst, calculated as germanium dioxide, is 0.008 to 0.04 weight percent, based on the weight of the ethylene terephthalate.

9. The process of claim 8 wherein the dyeability improver is selected from the group consisting of $C_{14-15}H_{29-31}O(CH_2CH_2O)_{14}H$ and

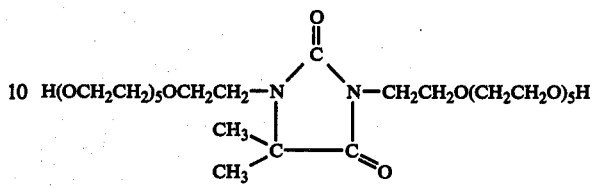

and the phosphine oxide is selected from the group consisting of bis(carboxyethyl) methyl phosphine oxide and bis(hydroxypropyl) phenyl phosphine oxide.

10. The process of claim 9 wherein the phosphine oxide is bis(hydroxypropyl) phenyl phosphine oxide and the dye improver is $C_{14-15}H_{29-31}O(CH_2CH_2O)_{14}H$.

11. The process of claim 9 wherein the phosphine oxide is bis(3-hydroxypropyl) phenyl phosphine oxide and the dyeability improver is

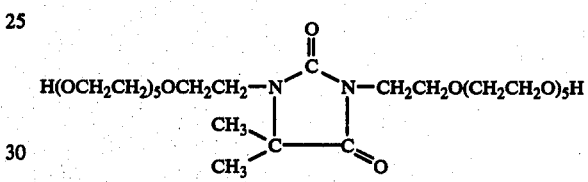

12. The process of claim 9 wherein the phosphine oxide is bis(carboxyethyl) methyl phosphine oxide and the dyeability improver is $C_{14-15}H_{29-31}O(CH_2CH_2O)_{14}H$.

13. The process of claim 9 wherein the phosphine oxide is bis(carboxyethyl) methyl phosphine oxide and the dyeability improver is

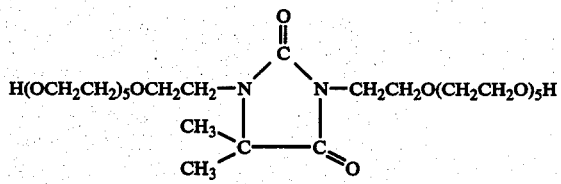

* * * * *